UNITED STATES PATENT OFFICE.

UTLEY WEDGE, OF ARDMORE, PENNSYLVANIA.

SULFURIC-ACID MANUFACTURE.

1,106,999. Specification of Letters Patent. Patented Aug. 11, 1914.

No Drawing. Application filed October 2, 1912, Serial No. 723,526. Renewed June 25, 1914. Serial No. 847,332.

*To all whom it may concern:*

Be it known that I, UTLEY WEDGE, a citizen of the United States, residing in Ardmore, Pennsylvania, have invented certain Improvements in Sulfuric-Acid Manufacture, of which the following is a specification.

The object of my invention is to so conduct the process of sulfuric acid manufacture, especially what is known as the "chamber process", that the exit gases will contain the proper percentage of sulfur dioxid ($SO_2$) to insure good recovery, in the Gay-Lussac tower or towers, of the nitrogen compounds contained in said exit gases. This object I attain in the manner hereinafter set forth.

In the practice of sulfuric acid manufacture, it has been known, in a general way, for many years, that if, after the oxidization and hydration of the sulfurous gas, some surfur dioxid is still present in the exit gases, the proper absorption, in the Gay-Lussac tower or towers, of the niter gases contained in said exit gases would be facilitated. The recovery of such niter gases is very important to the economical conduct of the process, but, so far as I am aware, the proper percentage of sulfur dioxid to secure the best results in the absorption of the niter gas has never been determined.

By applying to the exit gases a modification of the well known Reich's test hereinafter referred to, I have been able to determine very accurately the percentage of sulfur dioxid contained in said gases, and to detect very low percentages (as low as one one-hundredth of one per cent.) and having, by this means, gained a knowledge of the exact percentage of sulfur dioxid present in the gases passing through the Gay-Lussac tower or towers at different times I have, by long continued experiment, been able to demonstrate that the best results in the recovery of the nitrogen compounds are obtained if, under normal temperature conditions, the percentage of sulfur dioxid is from eight (8) to twelve (12) one-hundredths of one per cent. (1%) taken by volume. Under low temperature conditions, however, the percentage may be less and under high temperature conditions it may be higher, good results being obtained with a percentage sometimes as low as one one-hundredth (1/100) of one per cent., under temperatures approximating zero Fahrenheit, and sometimes with percentages as high as fifteen one-hundredths (15/100) of one per cent., with temperatures approximating one hundred (100) degrees Fahrenheit. The proper percentage is also affected in a measure by the number of Gay-Lussac towers which are employed, but in all cases the percentage of sulfur dioxid in the gases entering the first tower of a series should be sufficient to show a percentage of at least one one-hundredth of one per cent. in the final tower of the series. I therefore so operate the sulfuric acid apparatus as to maintain in the exit gases a percentage of sulfur dioxid calculated to obtain the best results under actual working conditions, the exit gases being tested at frequent intervals to determine the percentage of sulfur dioxid contained therein and undue excess or deficiency for proper recovery at that time being corrected by regulation of the drafts or by increasing or diminishing the supply of sulfur gas or niter gas admitted to the apparatus. By this means the chambers can be worked closer to their capacity, or if working to produce an ordinary output, the recovery of niter can be made so complete as to reduce the percentage of nitrate of soda or nitric acid necessary to be employed, this being true to the extent that it has a very considerable commercial advantage.

The modification of Reich's test before referred to consists in using in the absorption bottle an acid solution of some salt, preferably an acetate, of sodium, potassium, ammonium, zinc, or some other base, acetic acid being preferably employed to render the solution acid, although sulfuric or some other acid might be used, especially if the solution is that of an acetate. In place of the usual iodin solution of the Reich's test a much weaker solution can be used to show the customary color reaction. This chemical test, however, I do not claim as part of my invention.

With the tests of the exit gases may be combined tests of the gases entering the apparatus, since a knowledge of conditions at both ends of the apparatus will facilitate the regulation of the operation of the same with the view of providing a proper percentage of sulfur dioxid in the exit gases.

I claim:

1. The within described improvement in sulfuric acid manufacture, said improvement consisting in testing the exit gases passing from the chambers to the Gay-Lussac tower or towers to determine the percentage of sulfur dioxid contained therein, and regulating the operation of the chambers to maintain in said exit gases the percentage of sulfur dioxid which will insure the best recovery of niter in said Gay-Lussac tower or towers.

2. The within described improvement in sulfuric acid manufacture, said improvement consisting in testing for sulfur dioxid percentage the gases entering the chambers and those passing therefrom to the Gay-Lussac tower or towers, and regulating the operation of the chambers to maintain a predetermined percentage of sulfur dioxid in the exit gases.

In testimony whereof, I have signed my name to this specification, in the presence of two subscribing witnesses.

UTLEY WEDGE.

Witnesses:
KATE A. BEADLE,
HAMILTON D. TURNER.